(No Model.)

C. FRIES & W. H. RICHARDSON.
MILK CAN.

No. 504,027. Patented Aug. 29, 1893.

Witnesses:
William A. Barr.
R. Schleicher.

Inventors:
Charles Fries &
William H. Richardson.
by his Attorneys
Howson v Howson

UNITED STATES PATENT OFFICE.

CHARLES FRIES AND WILLIAM H. RICHARDSON, OF PHILADELPHIA, PENNSYLVANIA.

MILK-CAN.

SPECIFICATION forming part of Letters Patent No. 504,027, dated August 29, 1893.

Application filed November 7, 1892. Serial No. 451,208. (No model.)

*To all whom it may concern:*

Be it known that we, CHARLES FRIES and WILLIAM H. RICHARDSON, citizens of the United States, and residents of Philadelphia, Pennsylvania, have invented certain Improvements in Milk-Cans, of which the following is a specification.

Our invention relates to certain improvements in the construction of cans for holding and transporting milk and cream, its object being to provide for the keeping of the contents of the can in a fresh and sweet condition for a considerable length of time, and this object I attain in the manner hereinafter set forth, reference being had to the accompanying drawings, in which—

Figure 1:
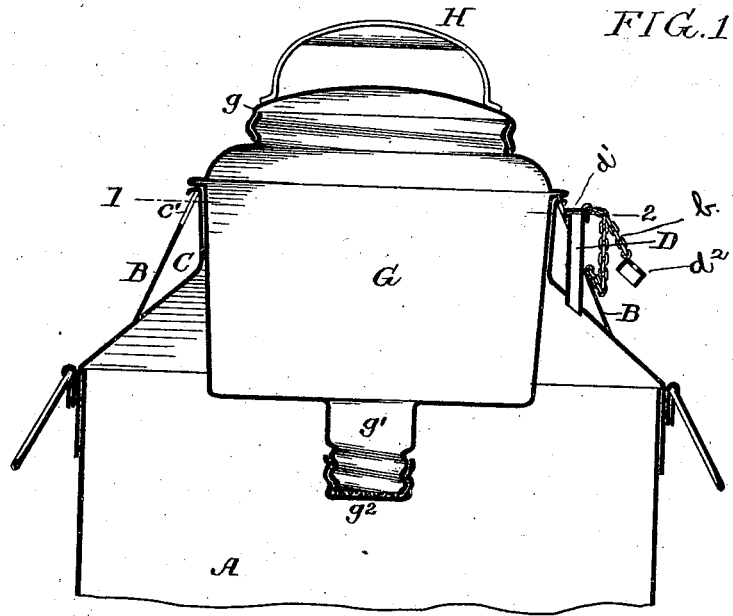
Figure 2:
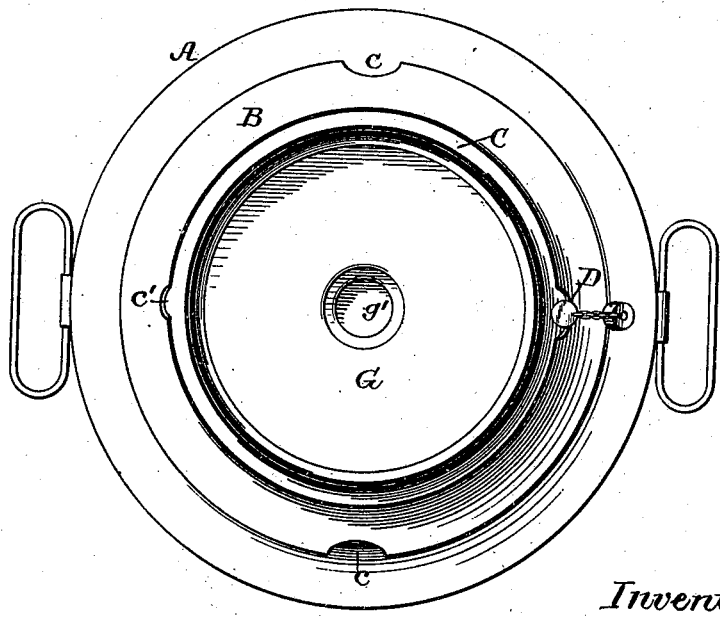

Figure 1 is a sectional view of the upper portion of a milk can. Fig. 2 is a sectional plan view of the same on the line 1—2, Fig. 1.

In the preservation and transportation of milk and cream much difficulty is experienced during the summer season in keeping the contents of the can in a fresh and sweet condition during the transportation and delivery of the same.

In carrying out our invention we provide, at the top of the can, a suitable receptacle for a refrigerant (preferably ice) and around the upper portion of the can is placed a chamber through which a circulation of air is induced to keep that portion of the can cool, and as the cream which rises to the top of the can is usually the first to sour the keeping of the top portion of the contents at a low temperature results in a constant circulation of the warmer portion of the milk at the bottom of the can and soon lowers the temperature of the entire contents of the can to a comparatively low degree.

Referring to the drawings A represents an ordinary form of milk can around the upper portion of which is a casing B forming between the casing and the body of the can a chamber C, the lower end of which communicates through apertures $c$ with the outer air and the upper end of which also communicates with the outer air through apertures $c'$, situated at points some distance from the aperture $c$ so that air entering the apertures $c$ must pass for some distance through the chamber C before it finally escapes through the outlets $c'$. One of the apertures $c'$ preferably surrounds a vent tube D which extends down and opens at its lower end to the interior of the can and at its upper end is open to the outer air; and attached to this vent tube or to the can is a chain or cord $b$ carrying at its opposite end two caps $d'$ $d^2$ or a single cap $d'$, as desired, the cap $d'$ being solid so that when placed over the top of the vent tube the passage of air through the vent tube may be left open or the cap $d^2$, having a small aperture, may be placed over its end so as to permit the passage of a small quantity of air. The top of the can is in the form of a cup G which extends down for some distance into the neck of the can and is provided with a screw cap $g$ which may be removed for the insertion of ice or other refrigerant; the cap being provided with a handle H by which either the cap or the entire receptacle may be removed. At the bottom of the receptacle G is a small chamber $g'$ to which is adapted a screw cap $g^2$, the chamber forming a drip cup into which the melted ice may run, being provided with the cap which can be removed in order to drain the drip water. By the use of this ice receptacle the top portion of the contents of the can is kept cool and the constant circulation maintained, which tends to bring the entire contents of the can into or nearly into contact with the refrigerating material and thus keep the contents of the can cool. The refrigerating medium being placed at the upper portion of the can immediately within the neck which is surrounded by the chamber C, keeps the chamber cool and induces a circulation of air through said chamber and at the same time the casing B prevents the rays of the sun from striking directly on the casing of the can and melting the ice by direct radiation, the constant circulation of air through the chamber C tending also to keep this outer casing cool.

It will be evident that our invention is also applicable to cans for transporting and holding various other articles such as ice cream or water or kindred substances.

Having thus described our invention, we claim and desire to secure by Letters Patent—

1. The combination of the can, a chamber for containing the refrigerating material secured to and forming part of the cover of said can, a removable cap for said chamber, a drip chamber at the bottom of the refrigerating chamber, and a cap for said drip chamber, substantially as specified.

2. The combination of the can, the casing surrounding the upper portion of the same and forming a circulating chamber, said casing being provided with inlet and outlet apertures for the circulation of air, substantially as specified.

3. The combination of the can, a refrigerating chamber at the upper portion thereof, a casing surrounding the upper portion of said can and forming a circulating chamber, said casing having lower inlet and upper outlet apertures arranged in different vertical planes so as to cause the air to travel part way around the circumference of the can, substantially as specified.

4. The combination of the can, with a vent tube extending through the can and having its opposite ends open respectively to the interior of the can and the outer air, with caps adapted to the upper end of said vent tube, substantially as specified.

In testimony whereof we have signed our names to this specification in the presence of two subscribing witnesses.

CHARLES FRIES.
WILLIAM H. RICHARDSON.

Witnesses:
  ROBT. GLENN,
  J. A. MCCOY.